(12) United States Patent
Gusain et al.

(10) Patent No.: US 9,062,169 B2
(45) Date of Patent: Jun. 23, 2015

(54) SLIT FILM TAPE COMPOSITIONS FOR IMPROVED TENACITY AND METHODS FOR MAKING SAME

(75) Inventors: Hari P. Gusain, Noida (IN); Willy J. J. Leysen, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 361 days.

(21) Appl. No.: 13/392,227

(22) PCT Filed: Oct. 13, 2009

(86) PCT No.: PCT/US2009/060510
§ 371 (c)(1),
(2), (4) Date: Apr. 4, 2012

(87) PCT Pub. No.: WO2011/046545
PCT Pub. Date: Apr. 21, 2011

(65) Prior Publication Data
US 2012/0184666 A1    Jul. 19, 2012

(51) Int. Cl.
| | |
|---|---|
| *C08L 23/14* | (2006.01) |
| *C08L 23/10* | (2006.01) |
| *C08K 3/26* | (2006.01) |
| *B29C 37/00* | (2006.01) |
| *C08J 5/18* | (2006.01) |
| *D01D 5/42* | (2006.01) |
| *D01F 6/46* | (2006.01) |

(52) U.S. Cl.
CPC ............... *C08J 5/18* (2013.01); *C08J 2323/10* (2013.01); *C08J 2323/16* (2013.01); *D01D 5/426* (2013.01); *D01F 6/46* (2013.01)

(58) Field of Classification Search
CPC ........... C08L 23/10; C08L 23/14; C08K 3/26; B29C 37/00
USPC ................... 524/425, 528, 502; 264/160, 103
See application file for complete search history.

(56) References Cited

U.S. PATENT DOCUMENTS

2005/0032959 A1 * 2/2005 Cheung et al. ................ 524/425

FOREIGN PATENT DOCUMENTS

| WO | 2006/124296 | 11/2006 |
| WO | 2008/060868 | 5/2008 |

* cited by examiner

Primary Examiner — James J Seidleck
Assistant Examiner — Deve E Valdez
(74) Attorney, Agent, or Firm — Jamie Sullivan; Leandro Arechederra, III

(57) ABSTRACT

Slit film tapes comprising (i) 1 to 50 wt % of a propylene elastomer based upon the total weight of the blend comprising 70 wt % to 95 wt % propylene and about 5 wt % to about 30 wt % alpha-olefin comonomer based upon total weight of the propylene elastomer. The propylene elastomer has a melt flow rate of 1 to 35 dg/min, a peak melting point of less than 115° C., and an mm triad tacticity of at least 70%; (ii) about 50 to about 99 wt % of a polypropylene based upon total weight of the blend comprising about 90 to about 100 mol % propylene wherein the polypropylene has a melt flow rate of 2 to 35 dg/min and a peak melting point of at least 130° C.; and (iii) 0.1 to 50 wt % of filler based upon the total weight of the blend.

11 Claims, 1 Drawing Sheet

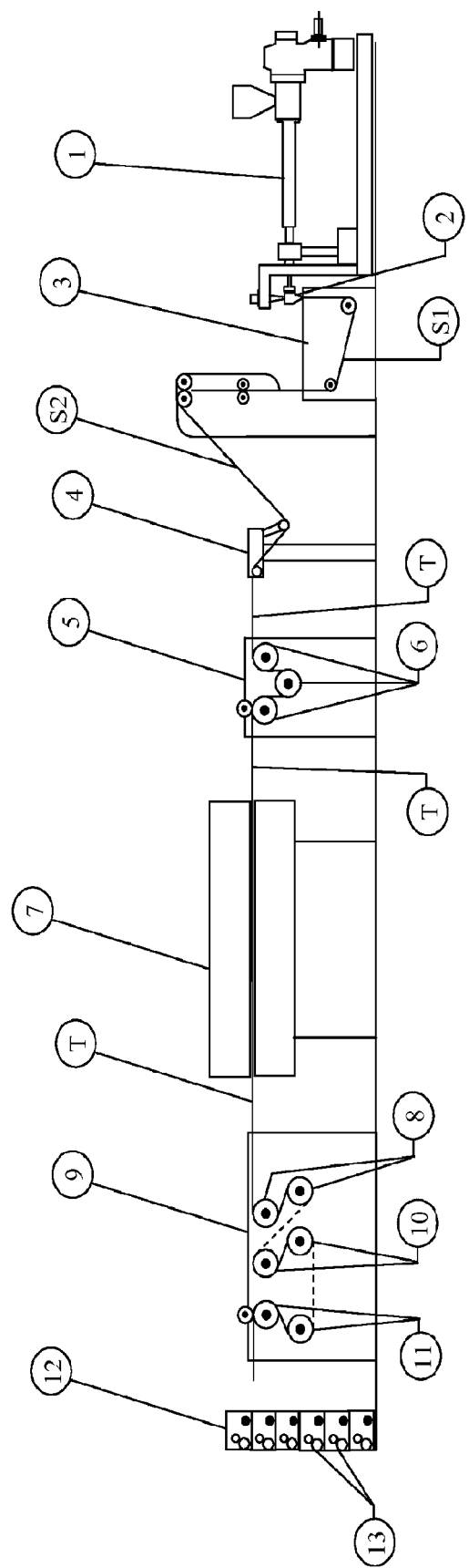

SLIT FILM TAPE COMPOSITIONS FOR IMPROVED TENACITY AND METHODS FOR MAKING SAME

PRIORITY CLAIM

This application is a national stage filing of International Patent Cooperation Treaty Application No. PCT/US2009/060510, filed Oct. 13, 2009, the disclosure of which is incorporated herein by reference in its entirety.

FIELD OF THE INVENTION

This invention relates to slit film tape compositions made from polymer blends. In particular, this invention relates to slit film tape compositions exhibiting improved tenacity and elongation and comprises a propylene elastomer, a polypropylene, and filler.

BACKGROUND OF THE INVENTION

Isotactic polypropylene and ethylene/propylene copolymers are often used in the industry to produce articles such as fibers, films, molded parts and nonwoven fabrics. Additionally, blending these polymers with other polymers has been the subject of past endeavors.

Slit film tapes prepared with polyethylene exhibit greater elongation and flexibility, higher elongation at break and lower tensile strength than stretched tapes prepared from other materials such as polypropylene. However, slit film tapes prepared from polyethylene suffer from inadequate processability. Polypropylene slit film tapes are produced by extruding a flat sheet that is slit into many narrow tapes. The tapes are then stretched in machine direction to reduce the thickness and to increase the tenacity (tensile strength divided by thickness). Typically, an anti-fibrillating masterbatch (AFMB) is added to remove the fibrillation of polypropylene, to reduce cost and increase stiffness of the slit film tapes.

It would be desirable to produce tapes, such as raffia tapes, having increased tensile strength and/or elongation, without losing or suffering significant loss in other properties. Moreover, would be desirable to reduce cost by either incorporating more AFMB or reducing the thickness while maintaining or improving the tenacity of the slit film tapes.

SUMMARY OF THE INVENTION

This invention relates to a slit film tape comprising a blend comprising:

i) about 1 to about 50 wt % of a propylene elastomer based on the total weight of the blend (as used herein the weight of the blend is defined to be the weight of propylene elastomer, polypropylene, and filler) comprising about 70 wt % to about 95 wt % propylene and about 5 wt % to about 30 wt % alpha-olefin comonomer, wherein the propylene elastomer has a melt flow rate of 1 to 35 dg/min, a peak melting point of less than 115° C., and an mm triad tacticity of at least 70%;

ii) about 50 to about 99 wt % of a polypropylene based on the total weight of the blend comprising about 90 to about 100 mol % propylene, wherein the polypropylene has a melt flow rate of 2 to 35 dg/min and a peak melting point of at least 130° C.; and iii) about 0.1 to about 50 wt % of filler based on the total weight of the blend.

This invention further relates to a process for producing slit film tapes comprising:

combining the propylene elastomer, polypropylene and filler (in neat or masterbatch form), extruding or otherwise forming the combination into a film, optionally quenching the film, optionally orienting the film, slitting the film into tapes, orienting the tapes in the machine direction.

This invention further relates to a process to produce raffia tape comprising: combining the propylene elastomer, polypropylene and filler (in neat or masterbatch form), extruding or otherwise forming the combination into a film, optionally quenching the film, optionally orienting the film, slitting the film into tapes, optionally orienting the tapes in the machine direction, and optionally winding the tapes onto spools or rollers.

This invention further relates to a process to produce an article comprising: combining the propylene elastomer, polypropylene and filler (neat or in a masterbatch form), extruding or otherwise forming the combination into a film, optionally quenching the film, optionally orienting the film, slitting the film into tapes, orienting the tapes in the machine direction, optionally winding the tape onto spools or rollers, weaving the tape into a fabric, and forming the fabric into an article.

BRIEF DESCRIPTION OF THE FIGURES

FIG. 1 illustrates an exemplary process for making slit film tape.

DETAILED DESCRIPTION OF THE INVENTION

Various specific embodiments, versions and examples of the invention will now be described, including preferred embodiments and definitions that are adopted herein for purposes of understanding the claimed invention. While the following detailed description gives specific embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

That said, as discussed below, the slit film tapes disclosed herein (otherwise known as raffia tapes, film bands, strips, stretched tapes, tape yarn and mono-axially oriented tapes) comprise a propylene elastomer, a polypropylene and a filler. In accordance with an aspect of the invention, the slit film tapes exhibit enhanced tenacity, elongation and/or resiliency.

DEFINITIONS

For purposes of this invention and the claims thereto, the term copolymer means any polymer comprising two or more monomers, and when a polymer or copolymer is referred to as comprising a monomer, the monomer present in the polymer or copolymer is the polymerized form of the monomer.

The term film applies to fabricated articles, extruded or otherwise, that have an average thickness in the range 0.1 to 25.0 mil (2.5 to 635 μm). Average thickness is defined as the average of thickness measurements taken for any 10 samples of film.

The terms "polypropylene," "propylene polymer," "polypropylene" or "PP" means homopolymers, copolymers, terpolymers, and interpolymers, comprising from about 50 to about 100 wt % of propylene-derived units based upon total weight.

"Ethylene-based polymer" means a polymer homopolymers, copolymers, terpolymers, and interpolymers, comprising from about 50 to about 100 wt % of ethylene-derived units based upon total weight.

"Neat" means a component that has not been blended with polymer or non-polymer to form a masterbatch.

"Polypropylene" (i.e., "semi-crystalline polymer") means an olefin polymer having a peak melting point (Tm) of at least 115° C. "Propylene elastomer" (i.e., "semi-amorphous polymer") means an olefin polymer having a peak melting point (Tm) of less than 115° C.

Peak Melting Temperature (Tm), peak crystallization temperature (Tc), heat of fusion (Hf) and percent crystallinity are determined using the differential scanning calorimetric (DSC) procedure described in WO 2006/065648 according to ASTM E 794-85.

Melt flow rate (MFR) is determined according to ASTM D-1238 (2.16 kg and 230° C.) unless otherwise noted.

As used herein, molecular weight (Mn and Mw) and molecular weight distribution (MWD or Mw/Mn) are determined by gel permeation chromatography using polystyrene standards as described in WO 2006/065648.

Propylene Elastomer

In various embodiments, the blends described herein comprise from about 1 to about 50 wt % of one or more propylene elastomers (based upon the total weight of the blend), preferably from about 2 to about 20 wt %, preferably from about 3 to about 10 wt %. The propylene elastomer preferably comprises isotactic propylene crystallinity, and preferably a percent crystallinity of about 1 to about 30%, preferably from about 3 to about 25%, preferably from about 4 to about 20%, preferably from about 5 to about 18%; and a melt flow rate of 1 to 20 dg/min, preferably 2 to 15 dg/min. Percent crystallinity is determined as noted above.

In an embodiment, the propylene elastomer comprises about 70 to about 95 wt % propylene, preferably about 80 to about 95 wt % (based upon the total weight of propylene elastomer). The propylene elastomer may further comprise about 5 to about 30 wt % of one or more $C_2$ to $C_{20}$ alpha-olefin comonomers, preferably from about 5 to about 25 wt %, preferably about 5 to about 20 wt % (based upon the total weight of the propylene elastomer). Preferably, the alpha olefin comonomer is a $C_2$ to $C_{10}$ alpha olefin selected from the group consisting of ethylene, butene, pentene, hexene, heptene, octene, nonene, and decene, preferably ethylene, butene, hexene, and octene, preferably ethylene. (For purposes herein, when a copolymer is described as comprising propylene and one or more $C_2$ to $C_{10}$ alpha olefins, the $C_2$ to $C_{10}$ alpha olefins do not include $C_3$. Likewise ethylene is considered an alpha-olefin.) The ethylene content of the propylene elastomers can be determined as described in WO 2006/065648, page 13, et seq.

Propylene elastomers useful herein preferably have a melt flow rate of 2 to 35 dg/min, preferably 2 to 20 dg/min, preferably 2-8 dg/min.

Propylene elastomers useful herein preferably have a peak melting point (Tm) of 115° C. or less, preferably 110° C. or less, as measured by the DSC procedure as noted above.

Propylene elastomers useful herein have an intermolecular composition distribution of 75% or more, preferably 80% or more, preferably 85% or more, preferably 90% or more by weight of the polymer isolated as one or two adjacent, soluble fractions with the balance of the polymer in immediately preceding or succeeding fractions; and wherein each of these fractions has a wt % comonomer content with a difference of no greater than 20 wt % (relative), preferably 10% (relative), of the average wt % comonomer of the copolymer. The fractions are obtained at temperature increases of approximately 8° C. between stages. The intermolecular composition distribution of the copolymer is determined by thermal fractionation in hexane as described in WO 2006/065648, page 14, et seq.

Preferred propylene elastomers useful herein preferably have a molecular weight distribution (Mw/Mn) of less than 5, preferably between 1.5 and 4, preferably between 1.5 and 3.

In various embodiments, the polymer is a random copolymer of propylene and at least one comonomer selected from ethylene, $C_4$-$C_{12}$ α-olefins, and combinations thereof. Preferably the random copolymers of propylene comprise from about 5 wt % to about 18 wt % polymerized ethylene units, based on the total weight of the polymer; have a narrow intermolecular composition distribution (e.g., 75% or more); have a peak melting point (Tm) of from 25° C. to 115° C., or from 35° C. to 110° C.; have a heat of fusion within the range having an upper limit of 75 J/g and a lower limit of 10 J/g; have a molecular weight distribution Mw/Mn of from 1.8 to 4.5; and have a melt flow rate 2 to 8 dg/min (as measured at 230° C., and 2.16 kg, ASTM D-1238).

In various embodiments, polymers that are useful herein as propylene elastomers include homopolymers and random copolymers of propylene having a heat of fusion as determined by DSC of less than 75 J/g, an MFR of 35 dg/min or less, and contain stereoregular propylene crystallinity preferably isotactic stereoregular propylene crystallinity. "Stereoregular" means that the predominant amount, i.e., greater than 80%, of the propylene resides in the polypropylene exclusive of any other monomer such as ethylene, has the same 1,2 insertion and the stereochemical orientation of the pendant methyl groups is the same, either meso or racemic.

A particularly preferred polymer useful herein as a propylene elastomer is a polymer with crystallinity due to stereoregular propylene sequences. The polymer can be: (A) a propylene homopolymer in which the stereoregularity is disrupted in some manner such as by regio-inversions; (B) a random propylene copolymer in which the propylene stereoregularity is disrupted at least in part by comonomers; or (C) a combination of (A) and (B).

In one embodiment, the useful polymers described above further include a non-conjugated diene monomer to aid in later chemical modification of the blend composition (such as crosslinking) The amount of diene present in the polymer is preferably less than 10% by weight, and more preferably less than about 5 wt % based upon total weight of the polymer. The diene may be any non-conjugated diene which is commonly used in ethylene propylene copolymers including, but not limited to, ethylidene norbornene, vinyl norbornene, and dicyclopentadiene.

In one embodiment, the propylene elastomer is a random propylene copolymer having a narrow composition distribution. In another embodiment, the propylene elastomer is a random propylene copolymer having a narrow composition distribution and a peak melting point of from 25° C. to 115° C., preferably 35° C. to 110° C., preferably 35° C. to 107° C. The copolymer is described as random because for a polymer comprising propylene, comonomer, and optionally diene, the number and distribution of comonomer residues is consistent with the random statistical polymerization of the monomers.

In various embodiments, propylene elastomers useful herein have a Shore A hardness (ASTM D-2240) of about 100 to about 40, preferably about 95 to about 50, preferably about 95 to about 60.

In various embodiments, propylene elastomers useful herein have a 1% secant flexural modulus (ASTM D-790, 23°

C.) of about 10,000 kPa to about 50,000 kPa, preferably about 10,000 to about 25,000, preferably about 10,000 kPa to about 12,000 kPa.

In various embodiments, propylene elastomers useful herein have a weight average molecular weight of from about 100,000 to about 1,000,000, preferably from about 150,000 to about 500,000 g/mol.

Preferred propylene elastomers used in embodiments described herein have a propylene tacticity index (m/r) ranging from a lower limit of 4 or 6 to an upper limit of about 8, 10, or 12. The propylene tacticity index, expressed herein as "m/r", is determined by $^{13}C$ nuclear magnetic resonance (NMR). The propylene tacticity index m/r is calculated as defined in H. N. Cheng, *Macromolecules*, 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, an m/r ratio of 1.0 an atactic material and an m/r ratio of greater than 1.0 an isotactic material. Isotactic materials theoretically have a ratio approaching infinity, and many by-product atactic polymers have sufficient isotactic content to result in ratios of greater than 50.

As used herein, isotactic propylene tacticity is defined to be an mm triad tacticity of at least 70%. Preferred propylene elastomers useful herein have an mm triad tacticity of three propylene units, as measured by $^{13}C$ NMR, of 75% or greater, 80% or greater, 82% or greater, 85% or greater, or 90% or greater. The triad tacticity is determined from a $^{13}C$ NMR spectrum of the polymer as described below and as described in U.S. Pat. No. 5,504,172. The mm triad tacticity of a polymer is the relative tacticity of a sequence of three adjacent propylene units, a chain consisting of head to tail bonds, expressed as a binary combination of m and r sequences. It is usually expressed for semi-amorphous copolymers described herein as the ratio of the number of units of the specified tacticity to all of the propylene triads in the copolymer. The mm triad tacticity (mm fraction) of a propylene copolymer can be determined from a $^{13}C$ NMR spectrum of the propylene copolymer and the following formula:

$$mm\ \text{Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

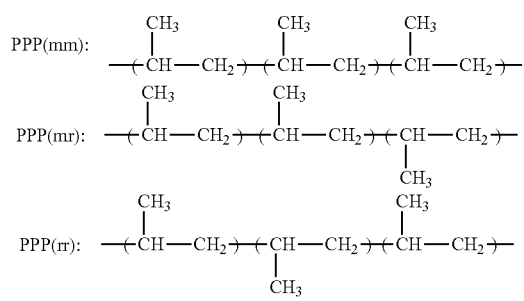

In another embodiment the polymer is a random copolymer of propylene and at least one comonomer selected from ethylene, $C_4$-$C_{12}$ α-olefins, and combinations thereof. Preferably, the random copolymers of propylene comprise from about 5 wt % to 1 about wt % polymerized ethylene units, based on the total weight of the polymer; have a narrow intermolecular composition distribution (e.g., 75% or more); have a peak melting point (Tm) of from about 25° C. to about 120° C., or from about 35° C. to about 80° C.; have a heat of fusion within the range having an upper limit of 75 J/g, 70 J/g, or 25 J/g and a lower limit of 1 J/g or 3 J/g; have a molecular weight distribution Mw/Mn of from 1.8 to 4.5; and have a melt flow rate of 2 to 20 dg/min (as measured at 230° C., and 2.16 kg, ASTM D-1238).

Propylene elastomers useful herein may be made using a metallocene catalyst system as described in WO 06/065648.

Propylene elastomers include VISTAMAXX™ Specialty Elastomers 3000, 3980, 6102, 6202, and VM™6000 available from ExxonMobil Chemical Company in Houston, Tex.

Polypropylene

In various embodiments, the blends described herein comprise from about 50 to about 99 wt % of a polypropylene (based upon the weight of the blend), and preferably from about 80 to about 98 wt %, preferably from about 90 to about 97 wt %. In a preferred embodiment, each polypropylene comprises about 90 to about 100 mol % propylene (based upon total moles of polypropylene), preferably about 95 to about 99.5 mol %, preferably about 97 to about 99 mole %, preferably 100 mole %. In a preferred embodiment, each polypropylene further comprises 0 to about 10 mol % of ethylene or an alpha olefin other than propylene (based upon total moles of polypropylene), preferably from about 0.5 to about 5 mole %, preferably about 1 to about 3 mole %. Preferably the polypropylene further comprises at least two alpha olefins other than propylene. Preferably the alpha olefins are $C_2$ to $C_{10}$ alpha olefins, preferably selected from the group consisting of ethylene, butene, pentene, hexene, heptene, octene, nonene, and decene, preferably ethylene, butene, hexene, and octene, preferably ethylene.

Suitable polypropylenes have a peak melting point (Tm—as measured by DSC as noted above) of at least about 115° C., preferably from about 120 to about 170° C., preferably from about 130 to about 165° C., preferably from about 140 to about 165° C., preferably from about 145 to about 160° C.

In another embodiment preferred polypropylenes useful herein have a peak melting point greater than about 115° C., preferably greater than about 120° C., more preferably greater than about 130° C. and/or a heat of fusion of greater than 60 J/g, preferably at least 70 J/g, preferably at least 80 J/g, as determined by DSC analysis as noted above.

Suitable polypropylenes have a melt flow rate of from 0.1 to 35 dg/min preferably from 0.1 to 20 dg/min, preferably 3 to 15 dg/min, preferably 2-8 dg/min. MFR is measured according to ASTM D-1238 Condition L (2.16 kg, 230° C.).

Preferred polypropylenes have an Elongation at Maximum Force of 20% or less, preferably 5-15%, and preferably 10% as measured by ASTM D-638.

Suitable polypropylenes have a 1% Secant Flexural Modulus of from about 100,000 psi to about 250,000 psi (690 to 1720 MPa), preferably from about 150,000 psi to about 250,000 psi (1031 to 1720 MPa) as measured by ASTM D-790A (0.05 in/min/1.3 mm/min). "High-crystallinity polypropylenes," e.g., those having values above about 250,000 psi (1720 MPa) can also be used.

The molecular weight of the polypropylene can be between about 10,000 to about 5,000,000 g/mol, alternatively about 25,000 to about 500,000 g/mol, preferably with a Mw/Mn between 1.5 to 4, preferably 1.5 to 3.

Preferred polypropylenes may be isotactic, highly isotactic, syndiotactic, or highly syndiotactic. In one embodiment, the polypropylene is an isotactic polypropylene. In another embodiment, the polypropylene is a highly isotactic polypropylene. "Isotactic" means having at least 10% isotactic pentads, preferably having at least 40% isotactic pentads of methyl groups derived from propylene according to analysis by $^{13}$C-NMR as described in U.S. Pat. No. 5,504,172. "Highly isotactic" means having at least 60% isotactic pentads according to analysis by $^{13}$C-NMR as described in U.S. Pat. No. 5,504,172 and above. In an embodiment, a polypropylene homo- or co-polymer having at least about 85% isotactic pentads is the polypropylene. In an embodiment, the polypropylene has at least about 90% syndiotactic pentads. "Syndiotactic" means having at least about 10% syndiotactic pentads, preferably at least about 40%, according to analysis by $^{13}$C-NMR as described in U.S. Pat. No. 5,504,172. As used herein, "highly syndiotactic" is defined as having at least 60% syndiotactic pentads according to analysis by $^{13}$C-NMR as described in U.S. Pat. No. 5,504,172.

Any propylene polymer having 0 to about 5 wt % comonomer, a peak melting point between about 115 and about 170° C., and an MFR of 35 dg/min or less may be used herein. Suitable examples include polymers produced by Ziegler-Natta catalyst systems, single-site (e.g., metallocene) systems, and combinations thereof. The polymers may be produced by any means including solution, slurry, gas phase, supercritical or high pressure. In an embodiment, the propylene polymers useful herein have a molecular weight distribution (Mw/Mn) of about 5 or less, preferably between about 1.5 and about 4, preferably between about 1.5 and about 3. In an embodiment, propylene polymers useful herein include those produced by metallocene catalyst systems. In another embodiment, propylene polymers useful herein include those having a composition distribution breadth index (CDBI) of about 60% or more, preferably about 70% or more, preferably about 80% or more, preferably about 90% or more. CDBI is measured as described in WO 93/03093, with the modification that any fractions having a weight average molecular weight (Mw) below 25,000 g/mol are disregarded.

Preferred propylene polymers that can be used in the practice herein include those propylene polymers sold by Exxon-Mobil Chemical Company under the trade name ACHIEVE™.

Particularly useful grades include ACHIEVE™ 3854 resin, ACHIEVE™ 1605 resin, available from ExxonMobil Chemical Company in Houston, Tex. Additional preferred propylene polymers useful in the practice herein include those propylene homopolymers, and random copolymers available from ExxonMobil Chemical Company under the grade names: PP1042, PP1032, PP1043N, PP1052, PP1063L1, PP1222F, PP5722E1, PP2252E1, PP2252E4, PP4772, PP4062C8, PP4152F2, PP4342C3, PP4352F1, PP4712E1, PP5112E1, PP5122E1, PP5032E1 and PP1572.

In a preferred embodiment, the polypropylene is a propylene homopolymer.

Filler

In various embodiments, the blends described herein comprise about 0.1 to about 50 wt % of filler, preferably from about 0.5 to about 40 wt %, preferably from about 1 to about 30 wt %, based upon total weight of the blend. Suitable fillers include, but are not limited to, titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, other metal oxides and carbonates, metal hydroxides, chrome, phosphorous and brominated flame retardants, antimony trioxide, silica, silicone, and blends thereof. These fillers may include any other fillers and porous fillers known in the art, and may have the other additives (such as colorants or oils) pre-contacted, or pre-absorbed into the filler prior to addition to the blend. Calcium carbonate may also be used.

In various embodiments, the filler is added to the blend via a masterbatch with polymer. The polymer may be a polyethylene, propylene elastomer, polypropylene, ethylene-based polymer, polybutene or other polyolefin. These components may be the same or different as the polyethylene, propylene elastomer, polypropylene, ethylene-based polymer present in the blend.

The filler is typically present in the masterbatch at up to about 90 wt %, typically at about 0.1 to about 80 wt %, typically about 1 to about 75 wt %, based upon the weight of the masterbatch. Information on preparing and using propylene elastomers as masterbatches is available in U.S. Pub. No. 2006/0247332 A1.

The filler may comprise about 1-99 wt % of an inorganic salt (based upon the total weight of the filler), which is defined as non-carbon containing ionic compounds comprising cations and anions such that the product is electrically neutral. In a preferred embodiment, the inorganic salt is calcium carbonate.

In an embodiment, the inorganic salt is blended with about 1 to about 99 wt % of an ethylene-based polymer, preferably about 5 to about 80 wt %, preferably about 10 to about 60 wt % (based on total weight of filler). The ethylene-based polymer may comprise about 50 to about 95 mol % ethylene, preferably about 85 to about 95 wt %, preferably about 90 to about 95 mol % (based on the total moles of ethylene-based polymer in the filler). The ethylene-based polymer comprises about 5 to about 20 mol % of at least one alpha olefin other than ethylene, preferably about 5 to about 15 mol %, preferably about 5 to about 10 mol % (based on the total moles of ethylene-based polymer in the filler), and have a CDBI greater than about 90%, even more preferably above about 95% (measured according to the techniques provided herein). In various embodiments, the ethylene copolymer has a density of about 0.86 to about 0.925 g/cm$^3$ and a CDBI of over about 90%, preferably between about 95% and about 99%. The ethylene copolymer density is determined according to ASTM D-1505. In another embodiment, the ethylene copolymer has a melt flow rate at 190° C. of about 0.1 to about 100 dg/min, preferably about 0.5 to about 50 dg/min, more preferably about 0.8 to about 30 dg/min (ASTM D-1238, 190° C., 2.16 kg). Several commercial products produced with such catalyst/activator combinations are commercially available from ExxonMobil Chemical Company in Baytown, Tex. under the tradename EXACT™.

When selecting polymers and masterbatches to use in the filler, it may be desirable to match properties of the individual polymers, such as rheological properties and/or melt flow rates. Preferably, the polypropylene, the propylene elastomer and the Masterbatch polymer have similar MFR's (such as within 5 dg/min of the polypropylene, preferably within 3 dg/min).

Additional Polymer Components

In various embodiments, the blends herein may further comprise one or more additional polymer components. Any suitable polymer may be used. For example, the additional polymer component may comprise low density polyethylene (density of about 0.915 to about 0.935 g/cm$^3$), linear low density polyethylene, ultra low density polyethylene (density about 0.85 to about 0.90 g/cm³), very low density polyethylene (density of about 0.90 to about 0.915 g/cm³), medium density polyethylene (density of about 0.935 to about 0.945 g/cm³), high density polyethylene (density of about 0.945 to about 0.98 g/cm³), or combinations thereof. For example, metallocene-catalyzed polyethylenes (mPEs). In a particular example, mPE homopolymers and copolymer are those produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Illustrative commercially available products are available from ExxonMobil Chemical Company, Houston, Tex., under the tradenames EXCEED™ and EXACT™, among others well known in the industry. Blends where the third component is a propylene polymer or copolymer, an EP or EPDM copolymer rubber, another polyolefin (e.g., EVA ethylene vinlyacetate) are also envisioned.

Blend Formation

The blends herein can be prepared by any procedure that causes the intimate admixture of the components. For example, they may be blended in a tumbler, static mixer, batch mixer, extruder, or a combination thereof. Moreover, the polypropylene component may be polymerized in one reactor (or one stage of one reactor) and transferred to a different reactor or different stage of the same reactor, where polymerization of the propylene elastomer occurs.

The blends may also be prepared by post-reactor mixing of the semi-crystalline and propylene elastomer components. The mixing step may take place as part of a processing method used to fabricate articles, such as in the extruder on a film or tape line. Likewise, the components can be combined by melt pressing the components together on a Carver press to a thickness of about 0.5 millimeter (20 mils) and a temperature of about 180° C., rolling up the resulting slab, folding the ends together, and repeating the pressing, rolling, and folding operation 10 times.

The propylene elastomer may be present in the slit film tape composition through direct addition to the polypropylene, through use as the base material for the AFMB, or both.

In another embodiment, the blends herein preferably have a melt flow rate (ASTM D-1238 Condition L; 230° C., 2.16 kg) of about 0.1 to about 35 dg/min, preferably about 0.5 to about 15 dg/min, preferably about 1 to about 10.

Slit Film Tapes Formation

In various embodiments, the slit film tapes described herein may be formed using various processes known in the art.

In an exemplary embodiment, a method for preparing the slit film tapes comprises: a) combining the polypropylene elastomer, propylene and filler into a combination; b) forming the combination into a film; and c) slitting the film sheet into a plurality slit film tapes.

In various exemplary embodiments, the tapes disclosed herein may be formed by direct extrusion (i.e., extrusion without slitting the film sheet).

In various embodiments, the method may further comprise one or more of stretching the film at elevated temperature (such as by passing the slit film tapes through a heating medium at a temperature just below the softening temperature of the slit film tapes), quenching the film, annealing and/or cooling the slit film tapes, and winding the slit film tapes.

In various exemplary embodiments, the method may further comprise weaving the slit film tapes into fabrics and/or forming the slit film tapes into bags, sacks, woven sacks, large industrial sacks and packaging fabrics, geo-textiles, carpet backing, carpet fibers, carpet yarn, ropes and twines and miscellaneous industrial woven fabrics.

In various exemplary embodiments, the method may further comprise mono-axially orienting the tapes by drawing in a longitudinal direction (machine direction), under heated conditions, to arrive at slit film tapes which can be described in terms of an orientation ratio, sometimes also referred to as the draw or stretch ratio. Preferred tapes have an orientation ratio of from about 4 to about 12.

FIG. 1 illustrates an exemplary process for making slit film tape. The method includes: extruding the polymer blend using screw extruder 1, which is equipped with extrusion die 2 to produce molten film sheet S1. Molten film sheet S1 enters cooling device 3 (e.g. a water bath) and solidifies as film sheet S2. Film sheet S2 is then fed under tension to film slitting unit 4, which slits the film sheet S2 into a plurality of slit film tapes T. Slit film tapes T may be contained in holding unit 5 prior to being fed through first set of rollers 6, which are generally at ambient temperature. Slit film tapes T are then processed through heating device 7 (e.g., a hot plate, heated rollers or a convection heating device, such as a hot air oven, which may be operated at a temperature between 95° C. and 175° C.) to higher speed rollers 8, typically referred as stretching rollers, where slit films T are oriented (e.g., to a stretch ratio of between 4 and 12. Slit films T are then annealed by passing them over heated rollers 10. In an exemplary embodiment, heated rollers 10 may be maintained at a temperature between 90° C. and 130° C. Heated rollers 10 may be run at approximately the same speed as the stretching rollers 8. Slit films T are then passed over cooled rollers 11, which may be operated at reduced surface speed than the stretching rollers 8 to anneal slit film T. Cooled rollers 11 may be cooled to a temperature between 15° C. and 25° C. The annealing ratio may be between 0.90 and 0.98. Slit films T are then wound on winding device 12 (e.g., cylindrical bobbins) comprising a plurality of winders 13.

As shown, stretching rollers 8, heated annealing rollers 10 and the cooled rollers 11 can be mounted on individual frames or mounted on a common frame, known as stretching aid annealing unit 9. However, it will be understood that any suitable method or equipment may be used to mount the rollers.

In various embodiments, there may be an auxiliary pressure roller resting on the slit film tapes in normal operation to provide a better controlled feed from last roller of each unit to the next operation. This roller can be lifted and turned to one side when threading the slit film tapes.

In an exemplary embodiment, the slit film tapes are laminated, by extrusion lamination or other means, to other monolayer or multilayer films.

In addition to the processes described above, the film tapes can be prepared by any fabricating mode recognized in the industry, such as film casting or film blowing. Slit film tapes can also be produced from extruded cast flat or tubular (blown) film.

The tapes may also be made by method and device using several bundles of slit film tapes can be seen in WO 2006/037571. According to this method, prior to the drawing process the group of slit film tapes (strips) is separated into several sub-groups of slit film tapes and then sub-groups are drawn separately at high speed.

Slit Film Properties

In various exemplary embodiments, the slit films disclosed herein have one or more of the following properties:

A tenacity of at least about 4 gpd, preferably at least about 5 gpd, preferably at least about 5.5 gpd (i.e., grams-force per denier). Tenacity is defined as the tensile stress divided by tape weight in denier. Tensile stress is determined according to ASTM D-882. Denier (measure of weight of the tape) is defined as the weight in grams of a tape yarn of 9000 meters in length; and a percent elongation of at least about 18%, preferably at least about 21%, preferably at about least 24%. Percent elongation is defined as the elongation expressed as a percentage of the gage length as determined by ASTM D-882.

EXAMPLES

Prophetic

The blends listed in Table A are prepared in a compounding extruder operating at a temperature above the melting temperature for all polymeric components. The blend is then processed on a commercially available Raffia tape line (such as a Konark Raffia Tape Line or a JP Industries Tape Stretching Line equipped with a 0.5 to 2 m die running at 250 to 430 kg/hour and at an extrusion temperature of about 200 to 300° C.). The blend is extruded through the die to form a cast film. The cast film is pulled over one or more cast film rollers which are set at the same of different temperatures to optionally pre-orient the film. The film is then passed through a slit die which cuts the film into a plurality of tapes of 1 mm to 10 cm in width. The tapes are them passed into an oven (set at 130 to 200° C.) and stretched in the machine direction to 100 to 12,000% of their original length. The tapes are then passed over a cool roll and wound onto spools. The splitter gap is 5 to 10 mm, specific blends are set out in Table A below.

SA-1=Vistamaxx 6102, a propylene-ethylene elastomer having about 16 wt % ethylene content by weight of the elastomer, an MFR of 3.0 dg/min, an mm triad tacticity of 90% mm, and a heat of fusion of 11 J/g.

SA-2=Vistamaxx 6202, a propylene-ethylene elastomer having about 15 wt % ethylene content by weight of the elastomer, an MFR of 20.0 dg/min, an mm triad tacticity of 90% mm, and a heat of fusion of 1 J/g.

SC-1=homo-polypropylene polymer PP5032E3, an isotactic homopolypropylene, having an MFR of 3 dg/min and a peak melting point of about 160° C.

AFMB-1=a masterbatch of 20 wt % SA-2, with 80 wt % calcium carbonate.

TABLE A

| Ex | 1 | 2 | 3 | 4 | 5 |
|---|---|---|---|---|---|
| SA-1 (wt %) | 1 | 3 | 5 | 6 | 10 |
| SC-1 (wt %) | 79 | 87 | 75 | 90 | 89 |
| AFMB-1(wt %) | 20 | 10 | 20 | 4 | 1 |

It is expected that one will obtain 1300 denier tapes with a tenacity of at least 5 gpd. Each of the above may be woven into a fabric to be used for the production of bags or to be extrusion coated with a layer of Vistamaxx or to be extrusion laminated to a reverse printed biaxially-oriented polypropylene (BOPP) film using Vistamaxx as bonding layer.

The embodiments and tables set forth herein are presented to best explain herein and its practical application and to thereby enable those skilled in the art to make and use the invention. However, those skilled in the art will recognize that the foregoing descriptions and tables have been presented for the purpose of illustration and example only. The description as set forth is not intended to be exhaustive or to limit the invention to the precise form disclosed. Many modifications and variations are possible in light of the above teaching without departing from the spirit and scope of the claims. Moreover, the term "comprising" is considered synonymous with the term "including" for purposes of Australian law.

We claim:

1. A process for producing a slit film tape comprising:
combining (i) a propylene elastomer comprising about 70 wt % to about 95 wt % propylene and about 5 wt % to about 30 wt % alpha-olefin comonomer based upon total weight of the propylene elastomer, wherein the propylene elastomer has a melt flow rate of about 1 to about 35 dg/min, a peak melting point of less than about 115° C., an mm triad tacticity of at least about 70%, and a narrow composition distribution; (ii) a polypropylene comprising about 10 to about 100 mol % propylene, wherein the polypropylene has a melt flow rate of about 2 to about 35 dg/min and a peak melting point of at least about 130° C.; and (iii) a filler;
forming the combination into a film;
slitting the film into tapes:
wherein the forming is performed in an extruder.

2. The process of claim 1, further comprising quenching the film.

3. The process of claim 1, further comprising orienting the film.

4. The process of claim 1, wherein the filler comprises an inorganic salt and about 1 to about 99 wt % of a composition selected from the group consisting of propylene elastomer, polypropylene, and an ethylene-based polymer.

5. The process of claim 1, further comprising weaving the tapes into a fabric.

6. The process of claim 5, further comprising forming the fabric into an article.

7. The process of claim 6, wherein the article is selected from a group consisting of a molded part, carpet yarn, carpet fiber, and non-woven fabric.

8. The process of claim 1, further comprising winding the tapes onto spools or rollers.

9. The process of claim 1, wherein the filler is present in neat form.

10. The process of claim 1 wherein the filler is present in masterbatch form.

11. The process of claim 1, wherein the filler comprises an inorganic salt and about 1 to about 99 wt % of a composition based upon total weight of the filler selected from the group consisting of propylene elastomer, polypropylene, and ethylene-based polymer.

* * * * *